Sept. 12, 1961

D. C. WELLER 3,000,004

MAGNETIC MEMORY ARRAY

Filed Feb. 4, 1959

2 Sheets-Sheet 1

INVENTOR
D. C. WELLER
BY William H. Kamstra
ATTORNEY

INVENTOR
D. C. WELLER
BY
William H. Kamstra
ATTORNEY

United States Patent Office 3,000,004

Patented Sept. 12, 1961

3,000,004

MAGNETIC MEMORY ARRAY

David C. Weller, Lake Mohawk, N.J., assignor to Bell Telephone Laboratories, Incorporated, New York, N.Y., a corporation of New York Filed Feb. 4, 1959, Ser. No. 791,230

23 Claims. (Cl. 340—174)

This invention relates to information handling systems and particularly to magnetic memory arrangements for storing binary information adapted for use in such systems.

Magnetic memorys, usually in the form of coordinate array matrices, are well known in the information handling and data processing arts and have made extensive use of such magnetic memory elements as toroidal magnetic cores, for example. Another magnetic memory element which has achieved prominence in the art is the magnetic wire element in which a preferred flux path has been established or with which such a preferred flux path has been integrally associated. Such magnetic wire elements are also highly adaptable for organization into coordinate memory arrays and are described in detail in the copending application of A. H. Bobeck, Serial No. 675,522, filed August 1, 1957. In a magnetic wire coordinate memory array there described the wires themselves comprise one of the sets of coordinates with serially connected corresponding solenoids coupled to the wires being arranged along the other sets of coordinates. The magnetic wires thus comprise highly advantageous and uncomplicated substitutes for the more expensive, well-known toroidal core storage elements in magnetic memory arrays.

In common with the earlier toroidal magnetic core memory arrangements, magnetic wire memorys exploit the physical characteristic of certain materials which is manifested in a substantially rectangular hysteresis loop. Thus, when driven to a magnetic saturation in one direction on the loop by a sufficiently large, applied magnetomotive force, a remanent flux in that direction is established in an address segment of the wire material. This remanent flux may be advantageously set as representing a given binary information value. The other binary value may then be represented by a remanent flux established in the wire segment in the opposite direction. The character of the binary value contained in the wire address segment by a representative magnetic state may subsequently be sensed by applying another, reading magnetomotive force to the wire segment. The reading magnetomotive force may be determined as being in the same direction for either binary value. As a result, for one of the values a complete traversal of the hysteresis loop by the reversing flux from a point of remanent magnetization to opposite saturation will take place. It is evident that for the other binary value, the representative remanent flux is already in a direction to which the reading magnetomotive force tends to drive it. As a consequence, ideally in this respect, no flux excursion at all should take place. Output voltage conditions induced by flux excursions in the wire segment in output means inductively coupled to the wire segment then indicate the particular binary value stored at the address segment. Obviously a complete flux excursion as described above will result in a full scale output signal and such a signal is generally held as indicative of the storage in the wire segment of a binary "1." When the application of a reading magnetomotive force fails to cause an appreciable flux excursion in the wire segment, no output voltage is generated, which absence of output signal is generally held as indicative of the storage in the wire segment of a binary "0."

In a theoretic case such as that just described, few problems would arise in distinguishing between the output voltage conditions indicative of respective binary values stored. Thus, two conditions, easily distinguishable—the presence or absence of an output signal—represent the two binary values. However, in practice such clearly defined output conditions are seldom, if ever, obtainable. Spurious or noise output signals are frequently encountered in most magnetic memory arrangements to obscure the character of the output signals and this is also true in connection with magnetic wire memory arrangements. The problem then is to distinguish between a full scale output signal which may be indicative of a binary "1" and spurious or noise output signals which may indicate that a partial flux reversal took place in the memory segment and therefore should be indicative of a binary "0."

One well-known source of noise resulting in what is termed a "shuttle" output signal is the fact that although the magnetic material of which the storage element is made exhibits a hysteresis characteristic or B—H loop which approaches the rectangular, the loop is not completely so. Thus, since the slope at the top and bottom of the loop is not zero, the excursion of the flux from a point of remanence to saturation in the same polarity causes some resultant change in the B direction of the loop. A corresponding shuttle output voltage is, as a result, generated in the coupled output means. Such a shuttle output signal must obviously be held to a minimum amplitude to insure the necessary disparity between the binary output voltage conditions.

Other sources of noise signals however are also present in magnetic wire memory arrangements. Noise signals may arise, for example, from the particular advantageous physical organization of such an array and its operation. In the construction of one such magnetic wire memory, for example, a plurality of memory wires are molded in an insulating, preferably plastic tape or belt and set in the order of 0.1 inch apart. Energizing solenoids are inductively coupled to each of the grouped wire elements by encircling the tape with a suitable electrical conducting means. When write currents are applied to the memory wires during the write phase of operation or read-out signals appear on the memory wires during the read phase of operation, interference between adjacent wire elements is frequently encountered. Incidental to the same advantageous construction, extraneous magnetic fields generated by currents in nearby energizing conductors or solenoids or other circuitry may also contribute materially to less than acceptable discrimination between the output signals representing different binary values. Generally it has been found that due to their unique character almost any of the noise signals encountered in analogous communication circuits may also be encountered in magnetic wire memory elements.

Noise signals further tending to degenerate the necessary range of discrimination may also be induced in a wire memory element by the echo effect produced by an impedance mismatch at the write or input end of the wire element during the read phase of operation. In this case an induced signal is reflected from the input end to be detected by the read circuitry as a spurious output subsequent to the detection of the desired information output signal.

One of the objects of this invention accordingly is to improve the signal-to-noise ratio for output signals in magnetic wire memorys.

It is another object of this invention to provide for the cancellation of shuttle output signals in magnetic wire memorys.

Still another object of this invention is to provide output transmission paths in magnetic wire memorys which paths present controlled and predictable transmission properties to thereby eliminate variations in signal strength and delay between the individual magnetic wire memory elements.

During the write phase of operation in a word organized magnetic wire memory array a relatively high current is applied to the particular memory wire in which an information bit, say a binary "1," is to be stored. This current is transmitted, in some arrangements, along the wire to the read detection circuits at which point, because of its amplitude, an overloading of the detecting amplifier may occur. Since the time interval between the write and read phase of operation is ordinarily extremely short, the interval may not be sufficient to allow for full recovery of the detection amplifier with the result that insufficient gain is available for the detection of read-out signals during the immediately following read phase of operation. Further, any transient currents following the applied write current pulse may also have insufficient time for dissipation between the write and read phases and, as a result, interfere with subsequently induced desired read-out signals.

Accordingly, it is a further object of this invention to prevent the overloading of output detection circuitry by write currents during the write phase of operation of magnetic wire memorys.

It is also an object of this invention to isolate transient residues of write currents applied during one phase of operation from output signals generated during a succeeding phase of operation of magnetic wire memorys.

In magnetic wire memory arrangements in which the memory serves as a buffer store between information handling circuitry providing information at one rate and information handling circuitry which receives information only at a relatively slower rate, it frequently becomes necessary to provide output detection circuits for each of the individual wire memory elements. When such a memory comprises a plurality of planar arrays, each of such arrays may be energized simultaneously while it may be necessary to read from only one at a time. As a result the read detection circuits of all but one of such arrays will be idle during a read phase of operation.

Accordingly, it is yet another object of this invention to reduce the number of read detection circuits required in a multiple plane magnetic wire memory.

Also an object of this invention is to provide a new and improved magnetic wire memory element.

A further object of this invention is to provide a new and improved magnetic wire memory array.

The foregoing and other objects are achieved in one specific illustrative embodiment of this invention comprising a multiple plane memory array each of the planes of which in turn comprises a plurality of parallelly arranged magnetic memory wires. Each of the memory wires may advantageously comprise an electrical conductor memory element such as that described in the aforementioned prior art and has either integrally associated therewith or inherently present therein a coaxial preferred helical flux path. The wire memory elements are arranged so as to present one of the sets of coordinates in each of the planes. Inductively coupled to each of the wires and defining information addresses thereon are a plurality of energizing windings or solenoids serially connected to present the other sets of coordinates of the planes. Each of the memory wires of each of the planes is connected at each end to one side of a transformer winding. An electrical conductor or return wire is associated with each memory wire of the planes and is connected between the other ends of the transformer windings. A basic wire memory element from which each of the planes is made up thus comprises the memory wire and its return conductor connected together at each end by a transformer winding. In accordance with the organization of the illustrative embodiment of this invention to be described in detail hereinafter, the address segments of the memory wires of each of the planes may contain corresponding bits of information words to be stored in the planes.

Each of the transformer windings coupling the memory wires and return conductors is center tapped, the center taps of the windings at one side of the planes being connected to ground. The center taps of the windings at the other side of each of the planes are connected to write current sources supplying write currents during the write phase of operation. Corresponding memory wire-return conductor elements of adjacent planes are coupled together by means of the transformer windings. The corresponding memory elements of the planes are thus serially connected to finally terminate in a single set of output detection circuits coupled by means of a transformer secondary winding respectively to the memory elements of the last plane of the array.

Advantageously, any currents applied to a center tap at the input side of a memory element will pass along a memory wire and its return conductor in the same direction and will be passed to ground through the center tap at the opposite end. As a result, the output detection circuits are effectively isolated from the relatively large applied write input currents during the write phase of operation.

In a similar advantageous manner, noise signals introduced in both a memory wire and its return conductor from sources generally described in the foregoing during the read phase of operation will also be passed to ground without being transmitted to the output detection circuits. Desired read-out signals representative of stored information being sensed will, on the other hand, be transmitted serially along corresponding memory wires of the planes to the output detection circuits. Since the signals representative of stored information are induced in a memory wire alone, the resulting unbalance of the parallelly connected memory wire and its return conductor will cause the signal to be transmitted along the serially connected memory wire-return conductor elements to the output detection circuits. Since in the particular embodiment of this invention to be considered hereinafter only one of the planes of the multiple plane array is to be interrogated during a given write phase, no interference from read-out signals from other planes will occur.

Shuttle output signals, since they generally occur only on the memory wire of a memory wire-return conductor pair, will also be serially transmitted to the output detection circuits. In accordance with one aspect of this invention, each of the planes is provided with an extra memory wire-return conductor pair. The memory wire and its return conductor of this pair are also connected at each end by a transformer winding, each of the windings also connecting the extra pairs of the planes of the array in series. No information change occurs in the extra, or shuttle reference memory wire and the magnetic state of each of its address segments will always be in the direction to which a read-out current tends to drive it. Thus, for each read-out current applied, a shuttle output signal will be generated in the shuttle reference memory wire of a plane. Such a shuttle output signal is generated only in the memory wire and not in its return conductor and is accordingly passed along the serially connected shuttle reference pairs of the planes to an output amplifier. At this point an amplified shuttle reference signal may advantageously be subtracted from the aggregate shuttle signals generated in the interrogated memory wires to achieve cancellation of the shuttle noise induced in those wires.

According to one aspect of this invention it is a feature thereof that a return conductor be paired with each memory wire of a magnetic wire memory array by means of center tapped transformer windings, with energizing currents applied to the memory wire across the center-taps.

It is another feature of this invention that corresponding memory wires of the planes of a multiple plane magnetic wire memory array be serially coupled by means of transformer windings.

Still another feature of this invention comprises the connection of output detection circuits only to the output end of the memory wires of the last plane of a multiple plane magnetic wire memory array.

According to still another aspect it is a feature of this invention that a shuttle reference memory wire is added to each plane of a multiple plane magnetic wire memory array, the shuttle reference memory wire of each plane being serially connected to effect a cancellation of shuttle output signals generated during the read phase of operation in the memory wires of any plane being interrogated.

The foregoing and other objects and features of this invention will be better understood from a consideration of the detailed description of a specific illustrative embodiment thereof which follows when taken in conjunction with the accompanying drawing in which.

Figure 1:
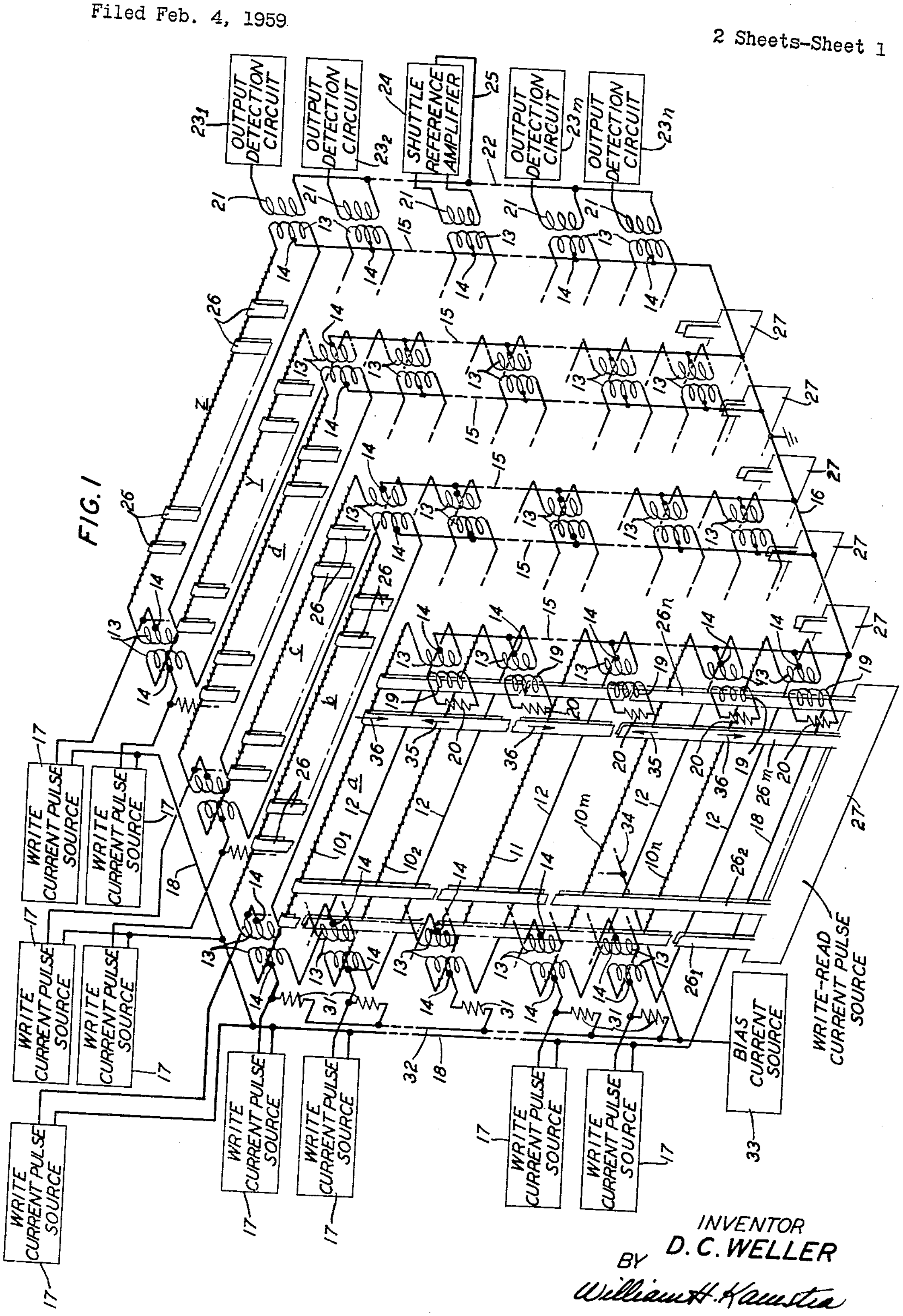
FIG. 1 shows an illustrative multiple plane magnetic wire memory array in which the planes are arranged for convenience in three-dimensional fashion and only such portions of the memory are shown as are necessary for a complete understanding of this invention.

The illustrative magnetic wire memory array depicted in FIG. 1 of the drawing comprises a plurality of memory planes *a*, *b*, *c*, *d*, . . . *y*, and *z*. The planes are arranged for purposes of illustration in three-dimensional fashion; however, as will become clear hereinafter, the planes may equally well be arranged adjacently to lie in the same planar surface. Each of the planes of the array in turn comprises a plurality of magnetic memory wires $\mathbf{10}_1$, $\mathbf{10}_2$, . . . $\mathbf{10}_m$, and $\mathbf{10}_n$. In addition, each of the planes includes an extra or shuttle reference magnetic memory wire 11, which latter memory wire 11 may conveniently be located centrally in the plane of memory wires 10. Each of the magnetic memory wires 10 and 11 advantageously comprises an electrical conductor having a helical flux path axially coincident therewith. The structure and advantages of such memory wires are described in detail in the copending application of A. H. Bobeck referred to hereinbefore. Associated with each of the memory wires 10 and also with the memory wire 11 of each of the planes *a*, *b*, *c*, *d*, . . . *y*, and *z* is an electrical return conductor 12 having substantially the same resistance as that of the associated memory wire. The memory wires 10 and 11 and return conductors 12 are connected respectively at each end through a transformer winding 13. Each of the transformer windings 13 is provided with a center tap 14, which center taps at one end of the memory wires 10 and 11 are connected to ground through ground buses 15 and 16. The center taps 14 of the windings 13 at the other end of the information memory wires 10 of each of the planes are connected respectively to a plurality of write current pulse sources 17. Each of the sources 17 comprises a circuit which may be of any well-known type capable of providing current pulses of a polarity and magnitude to be described hereinafter. Each of the sources 17 is also connected to ground through a ground bus 18 and the ground bus 16.

Thus far it is evident that each of the planes of the memory array comprises a plurality of memory wire-return conductor pairs or elements. Corresponding ones of these pairs of each of the planes are serially coupled together by means of the transformer windings 13. Thus, as is clear from the drawing, in the illustrative memory array being described, the memory wire-return conductor pairs of plane *a* are coupled by means of the transformer windings 13 to the corresponding such pairs of plane *b* at the write current input side of the planes. The memory wire-return conductor pairs of plane *b* are similarly coupled to the corresponding pairs of plane *c* at the ground side of the planes. This alternate coupling through the transformer windings 13 at the input side and ground side of the planes is continued through the memory array with the memory wire-return conductor pairs of the last plane *z* being coupled only to the corresponding pairs of the preceding plane *y* at the write current input side. In the particular three-dimensional configuration being described, the corresponding memory wire-return conductor pairs are alternately coupled head-to-head and tail-to-tail through the transformer windings 13. That is, the output ends of each of the pairs are presented on one side of the array and the input ends at the other side. It is obvious that, as a result, read-out signals representative of a particular binary value, although of the same absolute amplitude will differ in polarity depending upon the particular plane interrogated. This assumes that the same polarity read-out currents are applied and will become clear from a description of the operation of this invention which follows. It is to be understood, however, that by alternating the connection of a write current pulse source 17 with a ground connection at successive center taps of the transformer windings 13 at each side of the memory array, read-out signals of a single polarity may be achieved.

Each of the memory wire-return conductor pairs of the first plane *a* of the memory array has coupled to its winding 13 at the ground side another winding 19. Each of the windings 19 has connected thereacross a terminating resistance 20 presenting the characteristic impedance of the coupled memory wire-return conductor pair. The memory wire-return conductor pairs of the last plane *z* of the array each has coupled to its winding 13 at the ground side an output winding 21. One side of each of the output windings 21 associated with the information storage memory pairs of the plane *z*, that is, those comprising the memory wires $\mathbf{10}_1$ through $\mathbf{10}_n$ and the associated return conductors 12, is connected to a shuttle reference bus 22. The other side of each of the foregoing output windings 21 is connected to an output detection circuit 23. The circuits 23 may be of any type well known in the art capable, in this embodiment of the invention, of accepting two poled output signals of the same absolute magnitude representative of a binary value. Since such circuits are known to one skilled in the art, they need not be described in detail for a complete understanding of this invention. The output winding 21 associated with the shuttle reference memory wire-return conductor pair of plane *z* comprising its memory wire 11 and return conductor 12, is connected at its output ends to a shuttle reference amplifier 24. Amplifiers suitable for use as the amplifier 24 are also well known in the art and need not be more specifically described for a complete understanding of this invention. The shuttle reference amplifier 24 is connected at its output end to the shuttle reference bus 22 via a conductor 25.

As was stated previously herein the information stored in each of the planes *a* through *z* of the illustrative memory array being described is arranged on a word-organized basis. Thus, the address segments of the information memory wires 10 presenting one set of coordinates of the planes store corresponding bits of the information words stored in a plane. The information words themselves contained in the corresponding address segments of adjacent memory wires 10 are defined by energizing solenoids presenting the other set of coordinates of the planes. In the embodiment being described these solenoids comprise insulated conductors 26 each passing in one direction on one side of its plane and returning in the opposite direction on the other side of its plane. A conductor 26 thus completely encircles its associated plane thereby achieving the necessary inductive coupling with the enclosed memory wires 10 and 11 and return conductors 12 of the plane. For purposes of simplicity of illustration only representative conductors 26 are shown in the drawing. However, it is to be understood that each of the planes *a* through *z* has provided thereon the number of energizing conductors 26 as determined by the number of information words each plane is to store.

Figure 2:
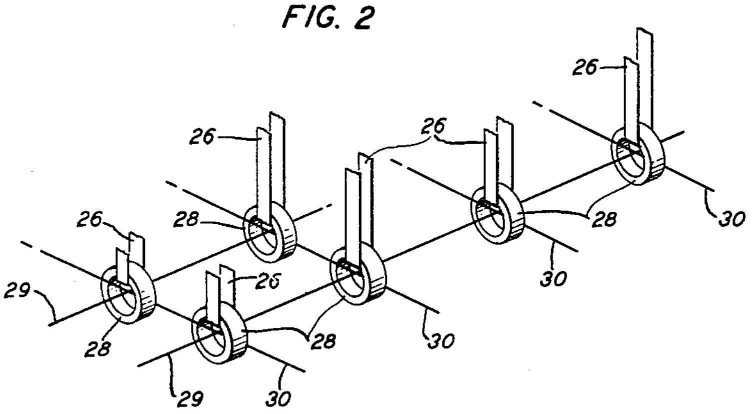
FIG. 2 shows a portion of an illustrative write-read current pulse switching arrangement which may be used in connection with a memory array according to the principles of this invention.

Each of the energizing conductors 26 originates and terminates in a write-read current pulse source 27. Since in the particular embodiment being described it is contemplated that a selected conductor 26 from each of the planes *a* through *z* may be simultaneously energized during the write phase of operation, a separate write-read current pulse source 27 is shown for each of the planes. The write-read current pulse sources 27 may comprise selection switch arrangements well known in the art generally associated with other magnetic memory arrangements. In one specific application of the principles of this invention, for example, it was found that a single plane toroidal magnetic core switching array was suitable for this purpose. In such an arrangement, an illustrative portion of which is depicted in FIG. 2, the cores 28 are arranged to correspond with the positions of the energizing conductors 26 of the present three-dimensional memory array, the conductors 26 being inductively coupled respectively to the cores of the toroidal core switching arrangement. The cores 28 in such a case are of the well-known square loop type and are selectively energized by well-known coincident current techniques. Thus, the coordinate conductors 29 and 30 threading the cores 28 would provide the means for applying such coincident switching currents.

Returning to a consideration of the input sides of the planes *a* through *z* of the present memory array, additional circuitry connected to the center taps 14 of each of the coupled transformer windings 13 may be described. Each of the center taps 14 of the windings 13, including the tap 14 of the shuttle reference memory wire-return conductor pair, of each of the planes is connected through a resistance element 31 and bias bus 32 to a source of bias current 33. The resistance elements 31 and bias buses 32 of the planes *b* through *z* are connected to the current source 33 via a conductor 34 shown in part.

In describing an exemplary cycle of operation of the illustrative memory array described in the foregoing, it will be assumed that a selected one of the energizing conductors 26 of each of the planes *a* through *z* is simultaneously pulsed during the write phase of operation. That is, one information word will be written in each of the planes during that period. For purposes of description it will be further assumed that in connection with plane *a* this information word is determined as the one stored in the address segments of the memory wires 10 defined by the energizing conductor $26_m$ and that in connection with each of the remaining planes *b* through *z* the specific location of the information word is left presently undetermined. The information word to be introduced in the address segments of plane *a* defined by the energizing conductor $26_m$ may further be given as containing the binary values 0, 1, . . . . 1, 0. In addition, it will be recalled that each of the shuttle reference memory wire-return conductor pairs of each of the planes is in a permanent magnetic condition corresponding to that also representative of a binary "0." These magnetic conditions may be symbolized in FIG. 1 of the drawing by the arrows 35 and 36, an arrow 35 representing a binary "1" and an arrow 36 representing a binary "0." In order to establish the above information representative magnetic conditions in the address segments of the helical flux paths of the memory wires 10 of plane *a*, coincident currents are applied to the energizing conductor $26_m$ and to the memory wires 10 defining the "1" bits of the information words. Thus in each plane, word selection is accomplished by the energizing conductors 26 and bit selection is accomplished via the memory wires 10 themselves.

Figure 3:
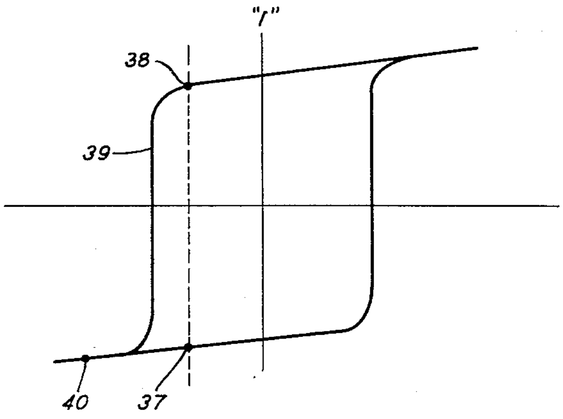
FIG. 3 is an idealized hysteresis characteristic loop of a typical magnetic material used in connection with the memory wires employed in this invention.

In accordance with the exemplary word to be written, current pulses of suitable polarity and each of a magnitude insufficient alone to cause a flux reversal in an address segment are coincidentally applied to the memory wires $10_2$, . . . $10_m$ and the selected conductor $26_m$. A full amplitude switching current pulse applied to a memory wire-return conductor pair from a write current pulse source 17 via a center tap 14 and winding 13 divides substantially equally in the two branches thus defined to achieve the partial write current pulse for a selected memory wire 10. The latter current pulse is carried to ground via the two sections of a winding 13, center tap 14, and buses 15 and 16 without inducing a similar current in the immediately following pair of the adjacent plane. Assuming the address segments presently selected to have been driven to a "0" magnetic state during a preceding read phase of operation, the application of the foregoing wire current pulses will switch or "set" the magnetic conditions of the selected address segments of the memory wires $10_2$, . . . . $10_m$ as represented by the arrows 35. Since no current pulse is applied to the shuttle reference memory wire 11 and only a partial switching current pulse is applied to the coupled energizing conductor $26_m$, the "0" magnetic conditions in that wire are left undisturbed during the write phase of operation. During this phase and simultaneously with the application of coincident write currents to the selected information address segments of plane *a*, selected information address segments of each of the planes *b* through *z* are magnetically set in the same manner. A consideration of FIG. 3 of the drawing will serve to clarify the foregoing write operation with reference to a typical hysteresis characteristic loop of the magnetic material of the memory wires. During both the write and read phase of operation a continuous bias current is applied to all of the memory wires 10 and the shuttle reference memory wire 11 of the array from the source 33 via the conductors 32 and 34 and resistance elements 31. The polarity and magnitude of the bias current are such as to magnetically bias each of the memory wires 10 and 11 to a predetermined point in the direction of opposite saturation from the direction established as representative of a binary "1." Thus, referring to FIG. 3, the selected address segments are driven from a point 37 to opposite saturation, ultimately to remain at a point 38 on the hysteresis loop 39 during the foregoing write operation. The effect of so biasing the memory wires will be further discussed in connection with a description of the read operation following.

As previously pointed out, only one plane of the array has a word address interrogated during the read phase of operation. For purposes of description it will be assumed that the information word, the writing of which was described in the foregoing, is to be read from the memory. To accomplish this read out a read current pulse is applied to the conductor $26_m$ from the write-read current pulse source 27 of a polarity opposite to that supplied for writing. In the particular embodiment being described it is contemplated that the write and read current pulses, although of opposite polarity, will be of the same absolute magnitude. Such oppositely poled current pulses are conveniently available when the sources 27 comprise magnetic core arrangements such as that shown in part in FIG. 2. Since the current pulses of the same absolute value applied to the conductors 26 must operate on a coincident current basis for writing and on a single current basis for word read out, provision must be made partially to disable the conductor 26 current pulses during the write operation. For this purpose the previously described shift in the magnetic remanence points is effected by the continuously applied bias current from the source 33. Thus, by referring again to FIG. 3 of the drawing it will be seen that when an address segment is in a "0" magnetic state, that is, when it is at the point 37 of the hysteresis loop 39, a single full valued switching current pulse from a source 27 will be insufficient to cause a flux reversal. Thus, during writing an assisting coincident current pulse from a source 17 is required to write an information bit, that is, a binary "1." When such a "1" has been stored, the containing address segment will be at the point 38 of the hysteresis loop 39 and at this point it is evident that a single full valued current pulse applied to a conductor 26 will alone be sufficient to drive the segment beyond the knee of the loop and cause a flux reversal.

In the present case, the application of a read current pulse opposite in polarity from that of the previous write current pulse to the conductor $26_m$ will cause a complete flux reversal in each of the memory wires $10_2, \ldots 10_m$. As a result and in accordance with the operation of magnetic memory wires generally a voltage is generated across the ends of these wires indicative of the information bits stored in their address segments interrogated. A current is thus induced in each of the parallel circuits comprising a memory wire 10, its terminating transformer windings 13, and its return conductor 12. This signal is transmitted from plane to plane along the transformer coupled memory wire-return conductor pairs to the output detection circuits 23. In this case output signals representative of binary "1's" are transmitted for amplification to the detection circuits $23_2, \ldots 23_m$. Since only one plane is interrogated at any given read-out, no interference between output signals can occur nor are such output signals of sufficient power to disturb information stored in address segments of other planes along which the signals are transmitted.

In the remaining memory wires 10 of the interrogated plane *a* containing binary "0's" and also in the shuttle reference memory wire 11, the application of the read current pulse to the conductor $26_m$ drives the containing address segments further into saturation, say to the point 40 of the hysteresis loop 39. That is, a "shuttle" of the magnetic flux takes place. The resulting induced voltages will also be transmitted from plane to plane appearing finally as shuttle output signals to the output detection circuits 23 and shuttle reference amplifier 24. Such shuttle output signals may also be generated as the result of the partial currents applied to the nonselected energizing conductors 26 of other planes caused by the secondary incidental shuttling of nonselected drive cores when the read current pulses are supplied by a switching arrangement such as that suggested in FIG. 2. It has been found that regardless of whether the shuttle signals are generated by the primary shuttling of the information address segments of the memory wires alone or whether a contribution occurs from other shuttle signal sources, the aggregate shuttle noise is substantially stable. According to the principles of this invention, a shuttle reference signal generated simultaneously with each read-out is amplified by the shuttle reference amplifier 24 the output of which is connected via the conductor 25 to the shuttle reference bus 22 common to one side of each of the secondary output windings 21 except that connected to the amplifier 24. An output signal from the amplifier 24 opposite in polarity from the shuttle output signals generated advantageously provides for a substantial cancellation of the latter signals.

The specific illustrative embodiment of this invention being described contemplates the connection of the write current sources 17 to one side of the physical array while the ground connections are assembled at the other side. The memory wire-return conductor pairs of the planes however are coupled input side to input side and ground side to ground side in alternating fashion to achieve the series extension of the pairs through the successive planes. As a result, although the flux excursions, both shuttle and reversals, caused in the memory wires during read out will be in the same direction in each of the planes, the resulting induced signals transmitted to the output end of the memory array will alternate in polarity from plane to plane. Accordingly, in this embodiment the character of the stored information bits is determined by the absolute value of a read-out signal, signals of both polarities being generated. In this case provisions well known in the art are made in connection with the output detection circuits 23 and amplifier 24 to accept the bipolar signals. Obviously, to obtain output signals of the same polarity a head-to-tail coupling with reference to the write current 17 inputs and ground of the memory wire-return conductor pairs may readily be made. Similarly poled output signals may also be achieved by reversing the memory wires and return conductors in alternate planes. By means of the latter expedient an improvement in transmission characteristics is also frequently possible.

In accordance with the principles of this invention the balancing of the magnetic memory wire with a return conductor, while advantageously passing information signals along the memory array, effectively cancels noise introduced from sources extraneous to the information address segments. In addition, a memory wire-return conductor pair is thus presented, the electrical properties of which may readily be calculated. Thus, power loss, transmission delay, degree of balance to ground, for example, are easily determined and therefore dealt with.

What has been described is considered to be only one specific illustrative embodiment of the principles of this invention and it is to be understood that various and numerous other arrangements may be devised by one skilled in the art without departing from the spirit and scope thereof.

What is claimed is:

1. An electrical circuit comprising a magentic memory wire having a flux path capable of assuming stable remanence states, an electrical return conductor, a first and a second balanced impedance means connecting said memory wire and said return conductor at each end respectively, means inductively coupled to said memory wire defining an information address thereon, means including a pulse source for applying a first current pulse to said last-mentioned means, and means including another pulse source for applying a second current pulse to one of said balanced impedance means coincidentally with said first current pulse to induce a stable remanence state at said information address.

2. An electrical circuit comprising a magnetic memory wire-return conductor pair, said memory wire having a helical flux path capable of assuming stable remanence states, said pair terminating at each end in a balanced impedance means, means inductively coupled to said pair defining an information address on said memory wire, means for applying a first current pulse to said last-mentioned means, and means for applying a second current pulse to one of said balanced impedance means coincidentally with said first current pulse to induce a stable remanence state at said information address.

3. An electrical circuit comprising a magnetic memory wire having a helical flux path capable of assuming stable remanence states, an electrical return conductor, a first and a second balanced impedance means for connecting said memory wire and said return conductor at each end respectively, energizing means inductively coupled to said memory wire and said return conductor defining an information address on said memory wire, input means for applying coincident write current pulses to one of said balanced impedance means and said energizing means to induce a stable remanence state at said information address, means for subsequently applying a read current pulse to said energizing means to reverse said stable remanence state at said information address, and output means for detecting flux reversals in said memory wire.

4. An electrical circuit according to claim 3 in which at least the first of said balanced impedance means comprises a first transformer winding having a center tap.

5. An electrical circuit according to claim 4 in which said output means includes a second transformer winding coupled to said first transformer winding.

6. An electrical circuit according to claim 5 in which said input means includes a pulse source connected between said second balanced impedance means and said center tap.

7. An electrical circuit comprising a first and a second magnetic memory wire each having a helical flux path capable of assuming stable remanence states, an electrical return conductor associated respectively with each of said memory wires, a plurality of balanced impedance means for connecting respectively the ends of said memory wires and said return conductors in pairs, the impedance means of at least one end of each of said pairs comprising coupled transformer windings each having a center tap, energizing means inductively coupled to each of said pairs defining an information address on each of said memory wires, and input means for applying coincident write current pulses across the impedance means and center tap of each of said pairs and to each of said energizing means to induce stable remanence states at said information addresses.

8. An electrical circuit according to claim 7 also comprising means for subsequently applying a read current pulse to one of said energizing means to reverse said stable remanence state at a defined information address, and output means for detecting flux reversals in either of said first and second memory wires.

9. An electrical circuit according to claim 8 in which the impedance means at the other end of one of said pairs comprises a center tapped transformer winding and in which said output means includes a transformer winding coupled to said last-mentioned winding.

10. An electrical circuit comprising a plurality of magnetic memory wire-electrical return conductor pairs, each of said memory wires having a helical flux path capable of assuming stable remanence states, a transformer winding having a center tap terminating each of said pairs, said pairs being serially coupled by said transformer windings, energizing means inductively coupled to each of said pairs defining an information address on each of said memory wires, means including a pulse source connected across the center taps of the windings of the transformer associated with each of said pairs for applying first write current pulses to said memory wires, means including a pulse source for applying a second write current pulse to each of said energizing means coincidentally respectively with said first write current pulses to induce a stable remanence state at each of said information addresses, means for subsequently applying a read current pulse to one of said energizing means to reverse said stable remanence state at a defined information address, and output means for detecting flux reversals in any of said plurality of memory wires.

11. An electrical circuit according to claim 10 in which said output means includes a transformer winding coupled to a winding of a terminal pair of said serially coupled pairs.

12. A memory array comprising a plurality of magnetic information memory wires each having a helical flux path capable of assuming stable remanance states, an electrical return conductor associated respectively with each of said memory wires, a balanced impedance means connecting the ends of each of said memory wires to the ends of an associated return conductor to present a plurality of information memory wire-return conductor pairs, a plurality of energizing means inductively coupled to each of said pairs defining a plurality of corresponding information addresses on said information memory wires, means for applying a first write current pulse to a selected one of said plurality of energizing means, means for applying a second write current pulse to balanced impedance means of selected ones of said pairs coincidentally with said first write current pulse to induce stable remanence states in one direction at corresponding ones of said information addresses representative of stored information, means for subsequently applying a read current pulse to said selected one of said energizing means to reverse the remanence states at said last-mentioned information addresses, said read current pulse shuttling the remanence states at other information addresses, and an output means associated with each of said pairs for detecting first voltage signals across said information memory wires caused by said reversals of said remanence states indicative of said stored information and second voltage signals across said information memory wires caused by said shuttling of said remanence states.

13. A memory array as claimed in claim 12 also comprising a shuttle memory wire having a helical flux path, said last-mentioned flux path being in a stable remanence state in the other direction, an electrical return conductor associated with said shuttle memory wire, a balanced impedance means connecting the ends of said shuttle memory wire to the ends of said last-mentioned return conductor to present a shuttle memory wire-return conductor pair, said plurality of energizing means also being coupled to said shuttle pair, said remanence state in said other direction being shuttled responsive to the application of said read current pulse to any of said plurality of energizing means, output means for detecting second voltage signals induced across said shuttle memory wire, and means for generating shuttle reference signals responsive to said last-mentioned second voltage signals for substantially canceling said second voltage signals across said information memory wires.

14. An electrical circuit comprising an information magnetic memory wire, a shuttle magnetic memory wire, each of said memory wires having a flux path capable of assuming two stable remanent flux states, an electrical return conductor associated with each of said memory wires, balanced impedance means connecting the ends of each of said memory wires respectively to the ends of its associated conductor, an energizing means inductively coupled to each of said memory wires and said associated conductors defining address segments on each of said memory wires, each of said address segments being in a remanent flux state in one direction, means for applying a read current pulse to said energizing means, said read current pulse shuttling the remanent flux in said address segments thereby generating a first shuttle signal across said information memory wire and a second shuttle signal across said shuttle memory wire, first output means for detecting said first shuttle signal, second output means for detecting said second shuttle signal, means responsive to said second shuttle signal for generating a cancellation signal, and means for applying said cancellation signal to said first output means for canceling said first shuttle signal.

15. An electrical circuit as claimed in claim 14 also comprising means for subsequently applying a first write current pulse to said energizing means and means for also applying a second write current pulse to the balanced impedance means connected to said information memory wire coincidentally with said first write current pulse to switch the remanent flux in said address segment of said information memory wire to determine a particular information value therein.

16. An electrical circuit comprising an information magnetic memory wire, a shuttle magnetic memory wire, each of said memory wires having a flux path capable of assuming two stable remanent flux states, an energizing means inductively coupled to each of said memory wires defining address segments on each of said wires, each of said segments having a remanent flux therein, means for applying a current pulse to said energizing means, said current pulse shuttling the remanent flux in said address segments to generate a first shuttle signal across said information memory wire and a second shuttle signal across said shuttle memory wire, first output means for detecting said first shuttle signal, second output means for detecting said second shuttle signal, means responsive to said second shuttle signal for generating a cancellation signal, and means for applying said cancellation signal to said first output means for canceling said first shuttle signal.

17. A memory array comprising a plurality of planes, each of said planes comprising a plurality of information magnetic memory wires, each of said memory wires having a flux path capable of assuming two stable remanent flux states and being in one of said states, a plurality of electrical return conductors associated respectively with said information memory wires, each of said information memory wires being connected at each end to an associated return conductor by means of a transformer winding having a center tap to present a plurality of information memory wire-return conductor pairs, and a plurality of energizing means inductively coupled to said pairs defining a plurality of information addresses on said information memory wires; corresponding memory wire-return conductor pairs of each of said planes being serially coupled by means of said transformer windings, means for applying first write current pulses to selected energizing means of said planes, and means for applying second write current pulses to the center taps of the transformer windings of one end of selected ones of said pairs of said planes coincidentally with said first write current pulses to induce the other of said stable remanent flux states representative of particular information values in particular information addresses of said memory array.

18. A memory array as claimed in claim 17 also comprising means for applying read current pulses to said selected energizing means of said planes, said read current pulses switching the remanent flux in said particular information addresses and shuttling the remanent flux in others of said information addresses, and a plurality of information output means for detecting information voltage signals generated responsive to said flux switching and shuttle voltage signals generated responsive to said flux shuttling in said information addresses, said output means including output transformer windings coupled respectively to the transformer windings of terminal pairs of said serially coupled memory wire-return conductor pairs of said planes.

19. A memory array as claimed in claim 18 also comprising a shuttle magnetic memory wire having a flux path, said flux path being in said one of said stable remanent states, and an electrical return conductor associated with said shuttle memory wire for each of said planes, said shuttle memory wire being connected at each end to said last-mentioned conductor by means of a transformer winding to present a shuttle memory wire-return conductor pair, said plurality of energizing means also being inductively coupled to said shuttle pairs; said shuttle pairs of each of said planes being serially coupled by means of said last-mentioned windings, a shuttle output means for detecting shuttle voltage signals generated responsive to the shuttle of flux in the shuttle memory wire of any of said planes, means responsive to said last-mentioned shuttle voltage-signals for generating a cancellation signal, and means for applying said cancellation signal to said plurality of information output means for canceling said shuttle voltage signals generated responsive to said flux shuttling in said information addresses.

20. A memory array as claimed in claim 19 in which said shuttle output means includes an output transformer winding coupled to the transformer winding of a terminal pair of said serially coupled shuttle pairs of said planes.

21. A magnetic memory array comprising a plurality of planes, each of said planes comprising a plurality of first magnetic memory wires, a second magnetic memory wire, each of said memory wires having a helical flux path capable of assuming stable remanence states when driven by applied energizing currents, a return conductor connected to each end of each of said memory wires by a transformer winding, center taps for the transformer windings connected to said first memory wires, a plurality of first energizing current means connected across each of said first magnetic memory wires through said center taps, a plurality of energizing windings coupled to each of said memory wires at corresponding information address segments thereof, and a plurality of second energizing current means connected respectively to said plurality of energizing windings; corresponding memory wires of each of said planes being serially coupled by said transformer windings, a plurality of first output circuits coupled respectively to the last of said serially coupled first memory wires, a second output circuit coupled to the last of said serially coupled second memory wires, and means for combining the output of said second output circuit with the outputs of said plurality of first output circuits.

22. A memory device comprising a pair of electrical conductors, one of said conductors having a helical flux path axially coincident therewith, said flux path being capable of assuming stable remanence states, balanced impedance means terminating said pair at each end, energizing means inductively coupled to said pair of conductors, means including said balanced impedance means and said energizing means for inducing a stable remanence state in said flux path, means also including said energizing means for switching said remanence state, and means for detecting voltage changes across said one of said conductors.

23. A memory device according to claim 22 in which said energizing means comprises an electrical conducting means passing closely adjacent one side of said pair in one direction and returning closely adjacent said pair in the other direction.

References Cited in the file of this patent

UNITED STATES PATENTS

| | | |
|---|---|---|
| 2,849,703 | Bindon et al. | Aug. 26, 1958 |
| 2,876,442 | Disson | Mar. 3, 1959 |

OTHER REFERENCES

"Thin Films, Memory Elements," Electrical Manufacturing, Jan. 1958, pp. 95–98.